(12) United States Patent
Iliev et al.

(10) Patent No.: US 12,705,614 B2
(45) Date of Patent: Aug. 11, 2026

(54) SYSTEMS AND METHODS FOR USE IN REDEMPTION OF TOKENS

(71) Applicant: MASTERCARD INTERNATIONAL INCORPORATED, Purchase, NY (US)

(72) Inventors: Issidor Iliev, White Plains, NY (US); Soumyajit Mitra, New York, NY (US); Jennifer Lorentz, Greenwich, CT (US); Colin Delarso, New York, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 6 days.

(21) Appl. No.: 18/244,719

(22) Filed: Sep. 11, 2023

(65) Prior Publication Data

US 2024/0086913 A1 Mar. 14, 2024

Related U.S. Application Data

(60) Provisional application No. 63/405,845, filed on Sep. 12, 2022.

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
None
See application file for complete search history.

(56) References Cited

U.S. PATENT DOCUMENTS

| | | | | |
|---|---|---|---|---|
| 11,477,005 | B1 * | 10/2022 | Lupowitz | H04L 9/3213 |
| 2019/0272538 | A1 * | 9/2019 | Arneson | G06Q 20/4012 |
| 2019/0303888 | A1 * | 10/2019 | Hamasni | G06Q 20/0655 |
| 2020/0265516 | A1 | 8/2020 | Xu | |
| 2021/0248594 | A1 | 8/2021 | Yantis et al. | |

FOREIGN PATENT DOCUMENTS

| | | |
|---|---|---|
| EP | 3259725 | 12/2017 |
| JP | 2020107228 A | 7/2020 |
| WO | WO2020/252036 | 12/2020 |
| WO | WO2022/125851 | 6/2022 |

* cited by examiner

*Primary Examiner* — Matthew S Gart
*Assistant Examiner* — Liz P Nguyen
(74) *Attorney, Agent, or Firm* — Harness, Dickey & Pierce, P.L.C.

(57) ABSTRACT

Systems and methods are provided for use in redeeming tokens. One example computer-implemented method includes receiving, by a processing network, from a first institution, an authorization request for redemption of a token by a user and checking a data structure escrow address associated with the redemption of the token. The method also includes, in response to the data structure address being indicative of the token, authorizing the redemption, whereby the institution transfers value associated with the token to the user.

11 Claims, 3 Drawing Sheets

SYSTEMS AND METHODS FOR USE IN REDEMPTION OF TOKENS

CROSS-REFERENCE TO RELATED APPLICATION

This application claims the benefit of, and priority to, U.S. Provisional Application No. 63/405,845, filed Sep. 12, 2022. The entire disclosure of the above application is incorporated herein by reference.

FIELD

The present disclosure is generally directed to systems and methods for use in employing a data structure for tokens and supporting the redemption of tokens through the data structure.

BACKGROUND

This section provides background information related to the present disclosure which is not necessarily prior art.

Cryptocurrencies are known to be exchanged as a form of currency, where the cryptocurrencies do not rely on any central authority to uphold or maintain the cryptocurrencies. Further, stablecoins are cryptocurrencies, for which value of the stablecoins is tied to that of another currency, commodity or financial instrument.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Certain tokens may be associated with value, whereby the tokens may be exchanged for products (e.g., good or services, etc.), or other currencies (e.g., U.S. dollar, etc.). One example token is stablecoin, which has a value tied to that of another currency, commodity or financial instrument. In this way, the stablecoin may have a value to $50 USD, whereby the exchange of the stablecoin may be related to a common currency, commodity or financial instrument. That said, technology deficiencies limit the manner and/or convenience of redemption of such tokens (e.g., stablecoin, etc.) for various reasons, whereby usability of the tokens is limited, in a technical manner, as onerous, prohibited, and/or troublesome.

Uniquely, the systems and methods herein provide for redemption of tokens (e.g., stablecoin, etc.) at one or more locations (e.g., institutions, etc.), where the locations are associated with a processing network. In this manner, the processing network is improved to include a specific data structure associated with the redemption, whereby the tokens are transferred to the data structure and confirmed, and a separate transfer of funds associated with the tokens is then layered into the processing network messaging. As such, redemption of such tokens leverages the improved processing network in a way that advances usability and/or availability of the tokens to users.

Figure 1:
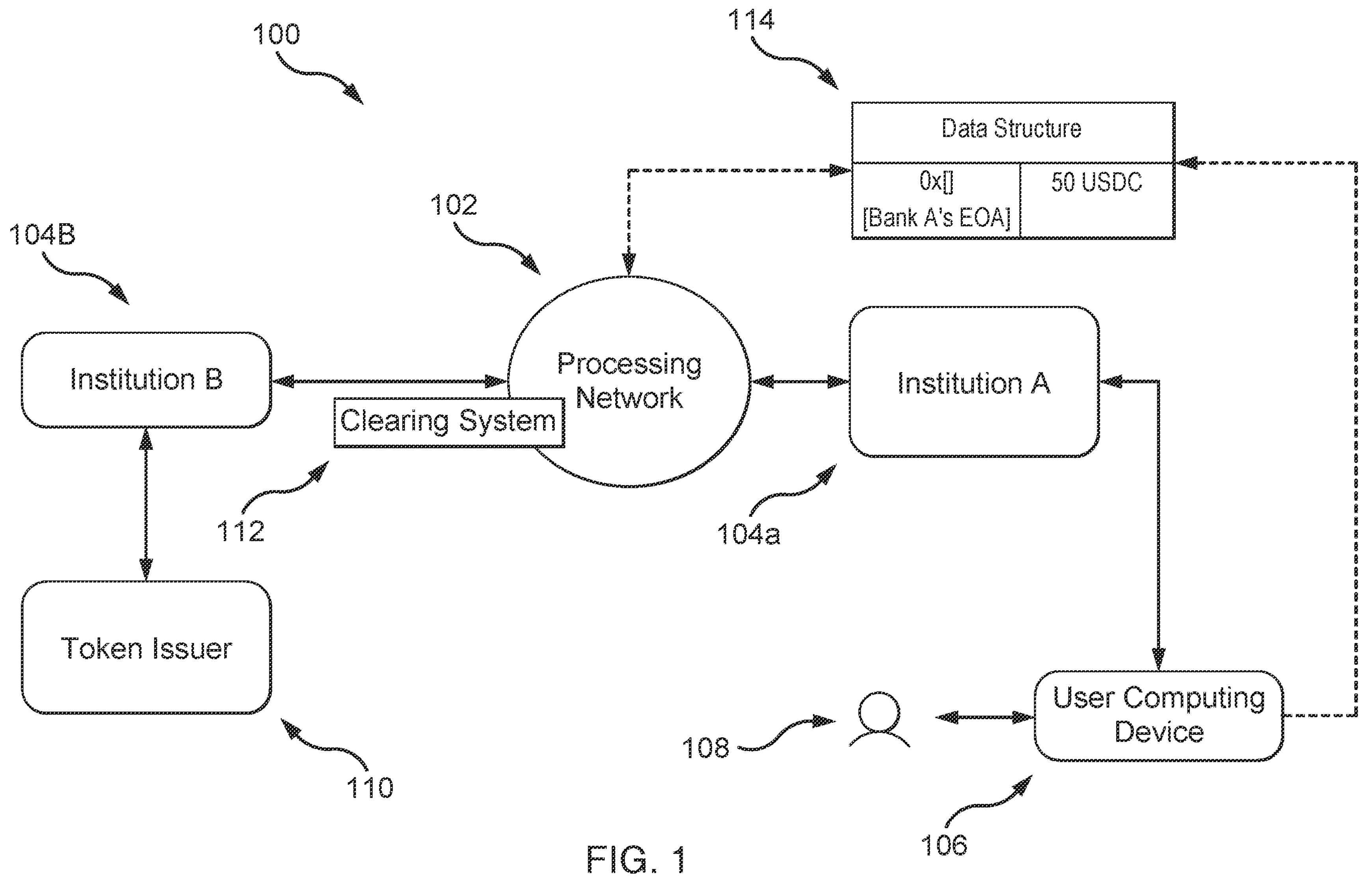
FIG. 1 illustrates an example system of the present disclosure suitable for use in redemption of tokens.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, privacy concerns and/or requirements, etc.

The illustrated system 100 generally includes a processing network 102, two financial institutions 104A and 104B (e.g., banks, etc.), a user computing device 106 associated with a user 108 (who may be associated or unassociated with the institution 104A), a token issuer 110 (e.g., a stablecoin issuer, etc.), and a clearing system 112, each of which is coupled to one or more networks. The network(s) (as indicated by the lines or arrowed lines in FIG. 1) may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof, etc.

In this example embodiment, the processing network 102 is configured to coordinate redemption of a token (e.g., stablecoin (e.g., USDC, etc.), etc.) presented by the user 108, via the computing device 106. The processing network 102 may include, for example, the MASTERCARD, VISA, or AMERICAN EXPRESS processing network or other suitable processing network, etc.

The institutions 104A, 104B each include a financial institution, such as, for example, a bank, etc., which is configured to participate in fund transfers between accounts. The institutions 104A, 104B are configured to issue one or more accounts to users, including the user 108, etc., and other entities, such as, for example, the token issuer 110, etc. The accounts may include, without limitation, debit accounts, savings accounts, checking accounts, and/or payment accounts (e.g., credit accounts, debit accounts, prepaid accounts, etc.), etc.

In this example embodiment, the token issuer 110 is configured to issue tokens, such as, for example, stablecoins, cryptocurrency, etc., which may be transferred by users (e.g., the user 108, etc.) in exchange for products (e.g., goods, services, etc.) and/or fiat currencies. The fiat currencies include, for example, government backed currencies, such as, for example, the U.S. dollar (USD$), the Euro (€) etc. The tokens, in general, each include a sequence of data, which is unique. The tokens may have fixed values, which are tied to a fiat currency, commodity or other financial instrument. For example, then, a token may have a static "value" of $50 USD. It should be appreciated that other denominations, static or not, may be associated with other tokens in various embodiments. Such tokens may provide static value or stability by maintaining reserve assets as collateral or through algorithmic formulas to control supply.

The clearing system 112 of the system 100 is illustrated as part of the processing network 102. The clearing system 112 is configured to clear and settle transactions initiated through the processing network 102, whereby funds are moved from institution to institution, etc. It should be appreciated that the clearing system 112 may be separate from the processing network 102 in other embodiments. What's more, the system 100 also includes a data structure 114, which is an immutable data structure, such as, for example, a blockchain structure (e.g., managed or controlled by the processing network 102, a third party, etc.). The data structure 114 is organized by address, whereby data is stored based on block and/or address thereof. The data structure 114 may be a part of the processing network 102, as in this embodiment, or separate therefrom, and/or may be managed by the processing network 102, the token issuer 110, etc.

Based on the above, the user 108 who is in possession, or otherwise owns the token (e.g., stablecoin, cryptocurrency, etc.), which is associated with a particular value, may wish to redeem the token for funds in a local currency, or fiat currency, through the institution 104A. That is, the institution 104A has issued an account to the user 108, and the user 108 wishes to redeem the token for funds commensurate with the value of the token being deposited in that account. In connection therewith, the institution 104A is configured to redeem the token through the processing network 102, whereby the institution 104A is configured to direct the user 108 to transfer the token (e.g., the token, an amount associated with the token, etc.) to the data structure 114, at a particular address thereof, i.e., an escrow address (e.g., as an escrow contract and/or associated with an escrow contract, etc.). The escrow address is a location on the data structure 114, which may be managed by the processing network 102 and/or the token issuer 110.

In response, the user 108, via the computing device 106, transfers or posts the token (e.g., an amount associated with the token, etc.) to the data structure 114 at the escrow address. In connection with the user 108 transferring the token, the institution 104A is configured to initiate a transaction for the redemption of the token (or value associated with the token). In particular, the institution 104A is configured to compile an authorization request (e.g., consistent with the ISO 8583 standard, etc.) consistent with the redemption and submit the authorization request to the processing network 102. The authorization request may include a data element indicative of redemption of a token (e.g., a data element including an indicator of TOKEN_REDEMPTION_REQUEST, etc.), or the authorization request may include a new optional data element only present when the authorization request is related to the redemption of a token.

The processing network 102 is configured, in turn, to receive the authorization request from the institution 104A, to recognize the request for redemption of a token (e.g., based on the inclusion of the data element indicative of the redemption of the token, etc.), and to interact with the data structure 114 to check for the token and/or an associated value or balance in the escrow address (based the information included in the authorization request, etc.). In response to the check indicating the value/token is posted to the escrow address, the processing network 102 is configured to authorize the transaction, whereby an authorization reply (e.g., consistent with the ISO 8583 standard, etc.) is compiled and transmitted to the institution 104A. Further, the processing network 102 is configured to alert the token issuer 110 of the authorization of the transaction to redeem the token. In response, the token issuer 110 is configured to burn the token (e.g., the stablecoin(s), etc.) submitted to the data structure 114 at the escrow address. It should be understood that in this embodiment, the escrow address is a "one-way" only address and only the token issuer 110 is permitted to access the escrow address once the token is posted there. That is, any tokens in this escrow address indicated by the processing network 102 and/or the authorization are burned. It should be appreciated that the above can also be automated through a smart contract, which may be imposed, optionally, to enhance efficiency of the interaction above.

Consequently, consistent with the authorization, the institution 104A is configured to submit the transaction (i.e., the redemption transaction) to the processing network 102 (e.g., as part of a clearing file, etc.) for clearing. In connection therewith, the institution 104A is configured to disburse funds to the user 108, based on the processing network authorization. The processing network 102, and more specifically, in this example, the clearing system 112, is configured to clear the transaction between the institution 104A and the institution 104B, which is the issuer of an account to the token issuer 110. In this way, the clearing system 112 is configured to direct funds from the institution 104B to the institution 104A (along with other transactions, potentially), which generates two settlement amounts. The first settlement amount is paid from the processing network 102 to the institution 104A for enabling redemption of the token, and the second settlement amount is paid from the institution 104B (on behalf of the token issuer 110) to the processing network 102 for redeeming the token. The token issuer 110 is configured to then pay the institution 104B (or permit the institution 104B to debit its account). This, in effect, provides for a transfer from the account of the token issuer 110 at the institution 104B to the account of the user 108 at the institution 104A.

Once the transaction is settled, the associated obligations are resolved.

While two institutions 104A and 104B are shown in FIG. 1, it should be appreciated that multiple institutions may be included in the system 100 in other embodiments. What's more, it should be appreciated that the clearing and settlement of the transaction for redemption of the token may be combined with one or multiple other transactions (whether related to redemption or not) between the institutions 104A and 104B and other institutions.

Figure 2:
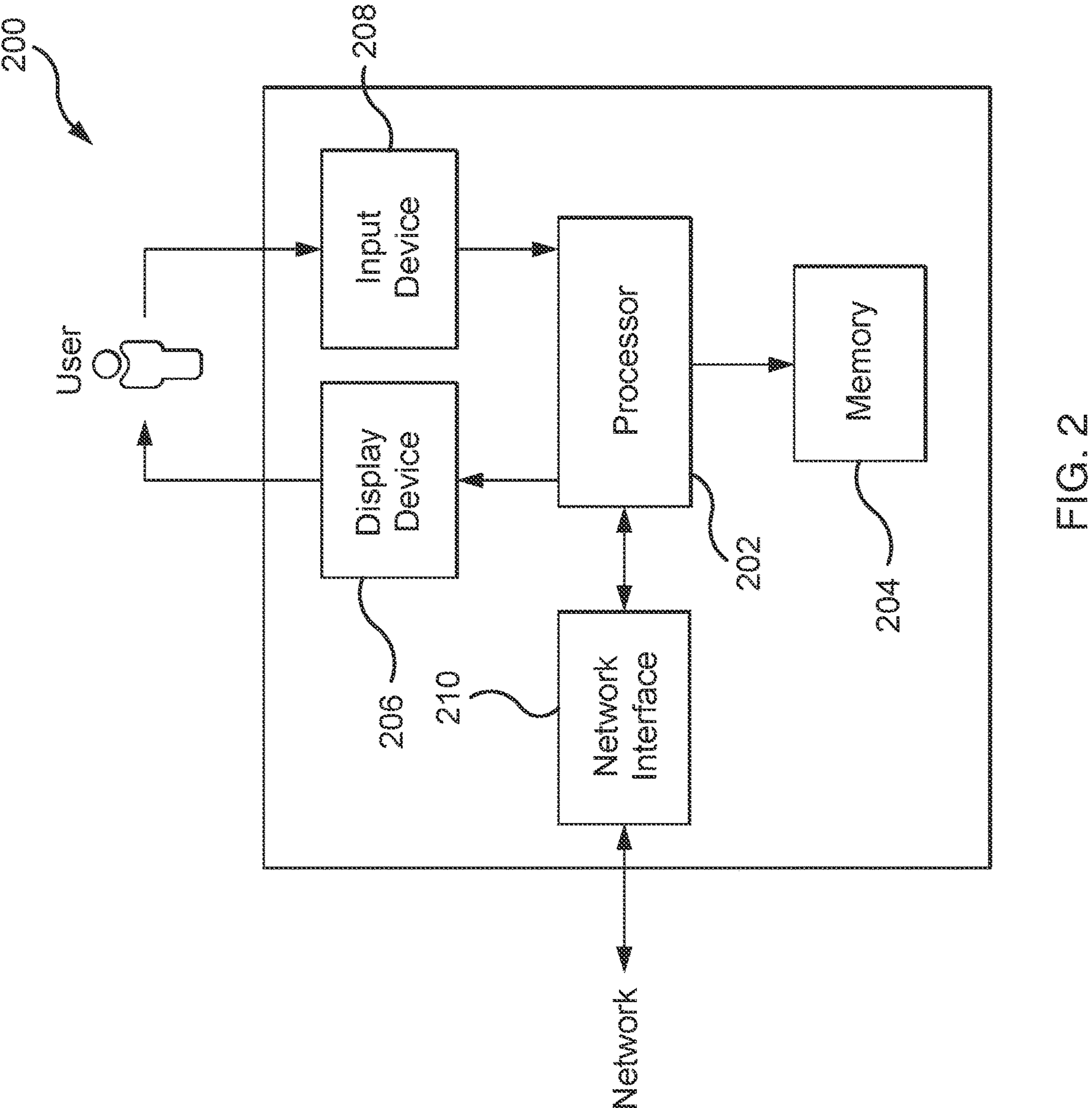
FIG. 2 is a block diagram of an example computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the processing network 102, the institutions 104A-B, the user computing device, the token issuer, the clearing system 112, and the data structure 114 may be considered, may include, and/or may be implemented in a computing device consistent with the computing device 200, coupled to (and in communication with) the one or more networks of the system 100. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor

202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, token addresses, clearing records, account balances, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations described herein, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 and an input device 208.

The presentation unit 206 is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200, etc. And, various interfaces may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

The input device 208 receives inputs from the user 112 (i.e., user inputs) of the computing device 200 such as, for example, inputs to redeem a token, etc., as further described herein. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein and/or with other devices described herein. In some example embodiments, the computing device 200 may include the processor 202 and one or more network interfaces incorporated into or with the processor 202.

Figure 3:
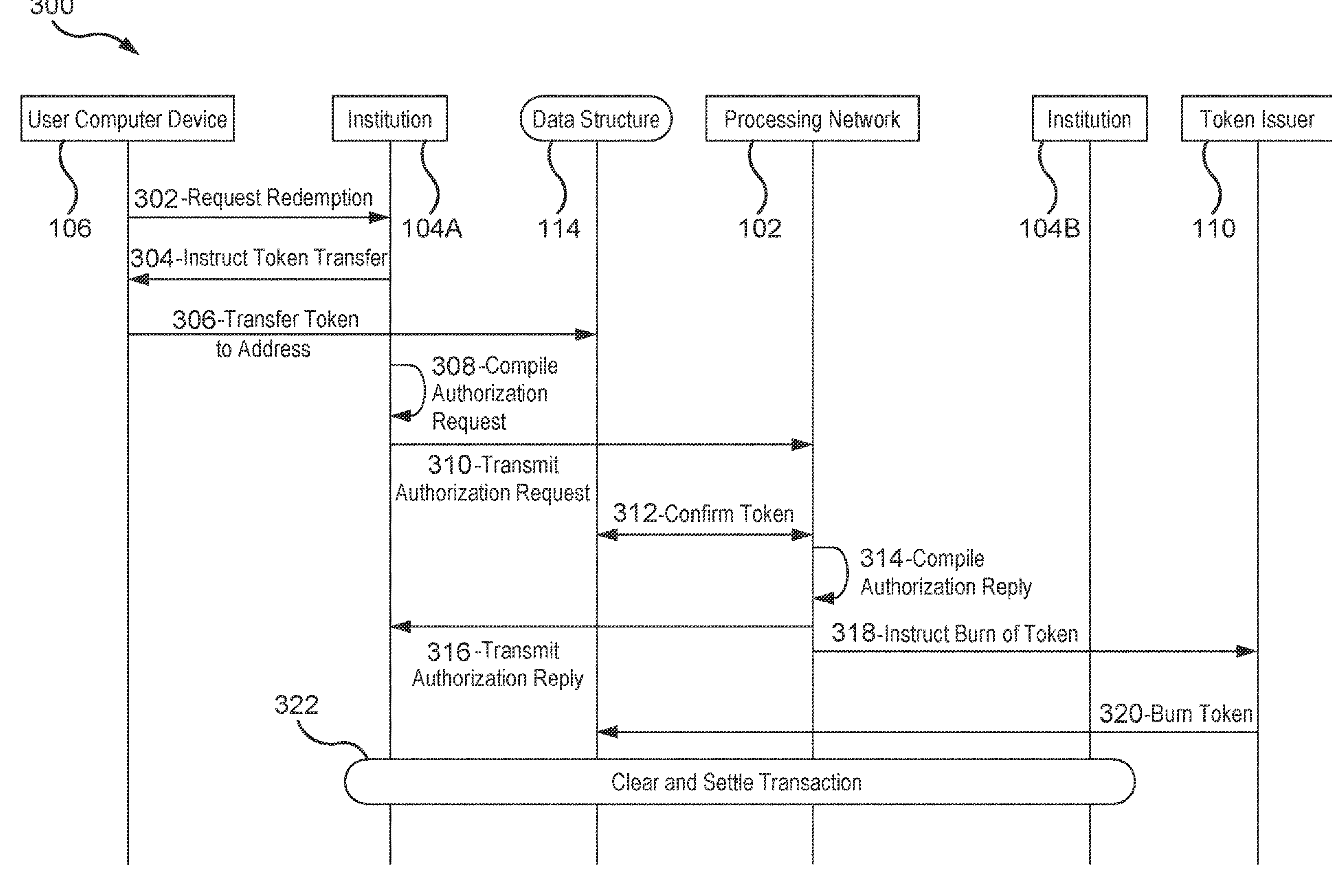
FIG. 3 illustrates an example method for redemption of tokens, which may be used in connection with the system of FIG. 1.

FIG. 3 illustrates an example method 300 for use in redeeming tokens. The example method 300 is described as implemented in the system 100, with further reference also made to the computing device 200. However, the methods herein should not be understood to be limited to the system 100 or the computing device 200, as the methods may be implemented in other systems and/or computing device. Moreover, the systems and the computing devices herein should not be understood to be limited to the example method 300.

At the outset, it should be understood that the token issuer 110 has issued numerous tokens, whereby each token is associated with some value, which may be static or dynamic. What's more, the user 108 is in possession of a token, which was issued by the token issuer.

In order to redeem the token, for funds deposited in an account issued to the user 108 by the institution 104A, the user 108 requests, at 302, via the computing device 106, to redeem the token with the institution 104A (e.g., generates and submits the request, etc.). The request may be submitted through an interface associated with a website or application of the institution 104A (as displayed to the user 108 at the computing device 106, for example). In connection therewith, the request may include, for instance, an indication of the token the user 108 wishes to redeem (e.g., as differentiated from other tokens the user 108 may have/possess, etc.), such as, for example, the amount, an identifier of the token issuer 110, and identifier distinguishing the token from other tokes of the user (and/or other tokens issued by the token issuer 110, etc.), etc. In response, at 304, the institution 104A instructs the user 108 to transfer the token to the data structure 114, and specifically, to a particular address, i.e., an escrow address, of the data structure 114.

In turn, at 306, the user 108, via the computing device 106, transfers the token to the data structure 114 at the escrow address (e.g., via the interface associated with the website or application of the institution 104A or otherwise, etc.).

Next, as shown in FIG. 3, the institution 104A compiles, at 308, an authorization request for a transaction of funds to the user's account (e.g., also in response to the request for redemption, etc.). The authorization request may be an ISO 8583 standard message, and may include (for example, and without limitation) the account number for the user 108, the amount of the transfer (i.e., the value to the token to be redeemed (subject to one or more fees)), the identifier of the token issuer 110, the escrow address for the token, an indication of the token (e.g., a symbol for the token (e.g., USDC (USD Coin), EUROC (Euro Coin), Tether USDT, etc.), etc.), etc. (e.g., included in one or more particular data elements (e.g., standard data elements, optional data elements, etc.) of the authorization request, etc.). The authorization request also includes an indication of a request for redemption of the token, thereby distinguishing the authorization request from a conventional authorization request (e.g., whereby an account number for the token issuer 110 may be omitted, along with other data, etc.). At 310, the authorization request is transmitted to the processing network 102.

Upon receipt of the authorization request, the processing network 102 recognizes the request as a redemption request (from the content of the data elements in the authorization request) and confirms, at 312, that the token is included at the escrow address of the data structure 114. When confirmed to be present, and having a value consistent with the amount of the authorization request, the processing network 102 authorizes the transaction. In connection therewith, the processing network 102 compiles, at 314, an authorization reply, which includes the transaction amount, an account number of the token issuer 110 and/or an identifier of the institution 104B, etc. In this example, the processing network 102 includes, or maintains, a record of accounts of token issuers (including the account of the token issuer 110). As such, the processing network 102 identifies the account of the token issuer 110 to be used in the transaction from this record, based on the information included in the authorization request (e.g., the identifier of the token issuer 110, the indication/symbol for the token, etc.). The authorization reply is transmitted to the institution 104A, at 316.

At the same time, or before or after, at 318, the processing network 102 instructs the token issuer 110 to burn the token. More particularly, in this example embodiment, the processing network instructs the token issuer 110 to burn a particular amount of the token from the escrow address for the token at the data structure 114 (e.g., "burn [x] amount of [token symbol] from escrow contract", etc.). In response, the token issuer 110 burns, at 320, the token (e.g., an amount of the token associated with the request/transaction, etc.) in the data structure 114. In some example embodiments, the token burn may be done automatically (e.g., the token burn may be an automated operation, etc.), following the instruction from the processing network 102. Further, in some example embodiments, the token issuer 110 may delegate the token burn to the processing network 102, whereby the processing network 102 may notify the token issuer of the burn instruction (or not) and then may burn the token (at 320).

In connection with the above, after the authorization, the transaction is cleared and settled by and between the institution 104A and 104B, through the processing network 102, whereby funds are transferred from the institution 104B to the institution 104A. The funds are debited from an account at the institution 104B issued to the token issuer 110, and credited to the account of the user 108 at the institution 104A.

In view of the above, the systems and methods herein provide for redeeming of token, such as, for example, stablecoins, through the advent of a data structure and/or improvement to the processing network. In this manner, redemption of tokens leverages the improved processing network in a way that advances usability and/or availability of the tokens to users.

As previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving, from a first institution, an authorization request for redemption of a token by a user; (b) checking a data structure escrow address associated with the redemption of the token; (c) in response to the data structure address being indicative of the token, authorizing the redemption, whereby the institution transfers value associated with the token to the user; (d) receiving a clearing record for at least the redemption of the token; and/or € settling redemption between the first institution and a second institution associated with a token issuer of the token.

In addition, the above-described embodiments of the disclosure may be implemented using computer programming or engineering techniques including computer software, firmware, hardware or any combination or subset thereof, wherein the technical effect may be achieved by performing at least one or more of the operations recited in the claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in redeeming tokens, the method comprising:

receiving, by a data structure, a one-way transfer of a token from a user computing device of a user to a data structure escrow address at the data structure, whereby the user surrenders possession of the token and the token is held in escrow at the data structure escrow address, wherein the data structure includes an immutable blockchain data structure;

receiving, by a processing network computing device, from a first institution, an authorization request for redemption of the token by the user into a fiat currency, the authorization request including the data structure escrow address, an account number specific to the user, an amount of the redemption, an indicator of the authorization request being for token redemption, and indication of a type of the token being redeemed, wherein the authorization request is consistent with the International Organization for Standardization (ISO) 8583 standard;

in response to recognizing, by the processing network computing device, based on the indicator, the authorization request as being for token redemption:

checking, by the processing network computing device, that the token is included at the data structure escrow address of the data structure;

checking, by the processing network computing device, that a value of the token to be redeemed is consistent with the amount of the redemption;

in response to the data structure escrow address including the token, with the amount of the redemption being consistent with the value of the token to be redeemed:

authorizing, by the processing network computing device, the redemption of the token, whereby the first institution transfers value associated with the token in the fiat currency to the user, based on the account number; and instructing, by the processing network computing device, a token issuer of the token to burn the token, whereby the token issuer burns the token with the data structure.

2. The computer-implemented method of claim 1, wherein the token includes a stablecoin.

3. The computer-implemented method of claim 1, further comprising:

receiving, by the processing network computing device, a clearing record for at least the redemption of the token; and settling, by the processing network computing device, amounts associated with the redemption between the first institution and a second institution associated with a token issuer of the token.

4. The computer-implemented method of claim 3, wherein the data structure escrow address is a one-way only address.

5. The computer-implemented method of claim 1, wherein the authorization request includes an indication of the token issuer of the token and a token symbol indicative of the type of the token.

6. A non-transitory computer-readable storage medium comprising executable instructions, which when executed by at least one processor in connection with redeeming a token, cause the at least one processor to:

receive, from a first institution, an authorization request for redemption of a token by a user into a fiat currency, the authorization request including a data structure escrow address at a data structure, an account number specific to the user, an amount of the redemption, an indicator of the authorization request being for token redemption, and indication of a type of the token being redeemed, wherein the authorization request is consistent with the International Organization for Standardization (ISO) 8583 standard, wherein the data structure includes an immutable blockchain data structure;

in response to recognizing, based on the indicator, the authorization request as being for token redemption:

check the token is included at the data structure escrow address of the data structure;

check a value of the token to be redeemed is consistent with the amount of the redemption;

in response to the data structure escrow address including the token, with the amount of the redemption being consistent with the value of the token to be redeemed:

authorize the redemption of the token, whereby the first institution transfers value associated with the token in the fiat currency to the user, based on the account number; and instruct a token issuer of the token to burn the token, whereby the token issuer burns the token with the data structure.

7. The non-transitory computer-readable storage medium of claim 6, wherein the executable instructions, when executed by the at least one processor, further cause the at least one processor to:

receive a clearing record for at least the redemption of the token; and settle amounts associated with the redemption between the first institution and a second institution associated with a token issuer of the token.

8. The non-transitory computer-readable storage medium of claim 6, wherein the authorization request includes an indication of the token issuer of the token and a token symbol for the token; and wherein the executable instructions, when executed by the at least one processor, further cause the at least one processor to retrieve the data structure escrow address from the authorization request prior to checking the data structure escrow address.

9. A system for use in redeeming tokens, the system comprising:

a processing network computing device coupled in communication with a computing device, which includes a data structure; and wherein the computing device is configured to receive a one-way transfer of a token from a user computing device of a user to a data structure escrow address of the data structure, whereby the user surrenders possession of the token and the token is held in escrow at the data structure escrow address, wherein the data structure includes an immutable blockchain data structure; and wherein the processing network computing device is configured to:

receive, from a first institution, an authorization request for redemption of the token by the user into a fiat currency, the authorization request including the data structure escrow address, an account number specific to the user, an amount of the redemption, an indicator of the authorization request being for token redemption, and indication of a type of the token being redeemed, wherein the authorization request is consistent with the International Organization for Standardization (ISO) 8583 standard;

check that the token is included at the data structure escrow address of the data structure and a value of the token to be redeemed is consistent with the amount of the redemption;

in response to the data structure escrow address including the token, with the amount of the redemption being consistent with the value of the token to be redeemed:

authorize the redemption of the token, whereby the first institution transfers value associated with the token in the fiat currency to the user; and instructing a token issuer of the token to burn the token, whereby the token issuer burns the token with the data structure.

10. The system of claim 9, wherein the data structure escrow address is a one-way only address.

11. The system of claim 10, wherein the processing network computing device is further configured to:

receive a clearing record for at least the redemption of the token; and settle amounts associated with the redemption between the first institution and a second institution associated with a token issuer of the token.

* * * * *